United States Patent [19]
Doucette

[11] Patent Number: 5,628,143
[45] Date of Patent: May 13, 1997

[54] RODENT POISON DISPENSER

[76] Inventor: Carl Doucette, 515 Eucalyptus Dr., El Segundo, Calif. 90245

[21] Appl. No.: 490,329

[22] Filed: Jun. 14, 1995

[51] Int. Cl.$^6$ ................................................. A01M 25/00
[52] U.S. Cl. .................................................. 43/124; 43/131
[58] Field of Search ........................................ 43/131, 124

[56] References Cited

U.S. PATENT DOCUMENTS

| | | | |
|---|---|---|---|
| 2,299,723 | 10/1942 | Allbright | 43/131 |
| 2,683,326 | 7/1954 | Gardner et al. | 43/131 |
| 4,765,091 | 8/1988 | Sherman | 43/131 |
| 5,038,516 | 8/1991 | Doucette | 43/131 |
| 5,448,852 | 9/1995 | Spragins et al. | 43/131 |

*Primary Examiner*—Jeanne M. Elpel
*Attorney, Agent, or Firm*—Beehler & Pavitt

[57] ABSTRACT

A poison bait dispenser for rodents which may dispense liquid or solid poisoned bait, or both, comprising a housing having a front member and a rear member hinged and securable together and defining a space in which is provided a first pathway between two opposite side openings, which pathway is defined by the back wall of the rear member and partial walls spaced from the back wall. The partial walls provide support for the poison bait dispensers and also front trough walls defining a second pathway extending between the troughs. The second pathway is connected to the first pathway between the troughs. Solid bait may be dispensed as blocks slideable down into one trough on a vertical axis. A special cap dispensing member may be provided for the liquid bait. Special locking arrangement with pin keys of preselected lengths prevents passable opening of the dispenser by unauthorized persons.

4 Claims, 4 Drawing Sheets

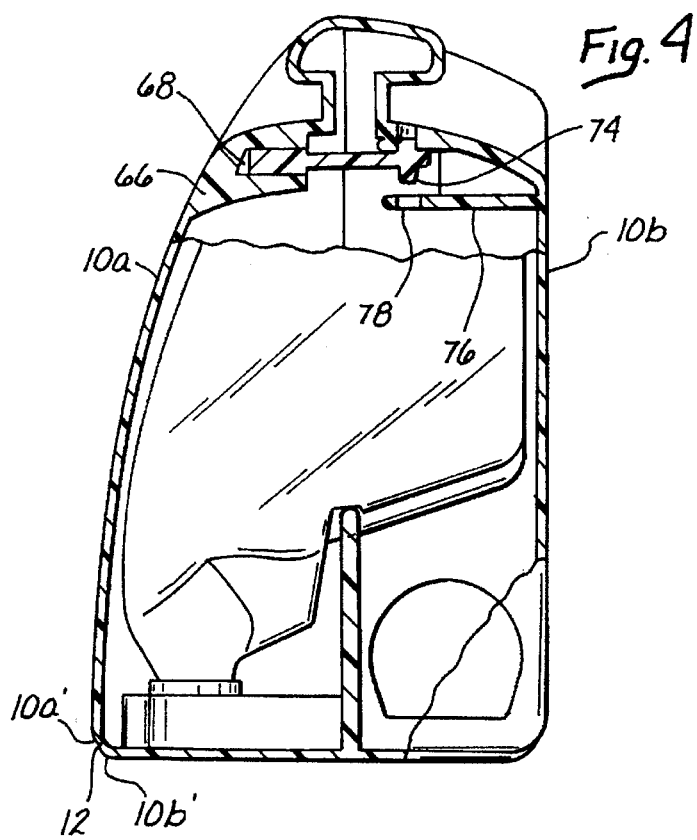
Fig. 4
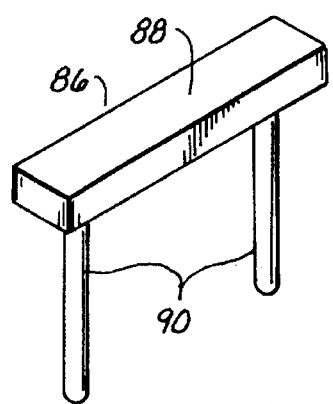
Fig. 6
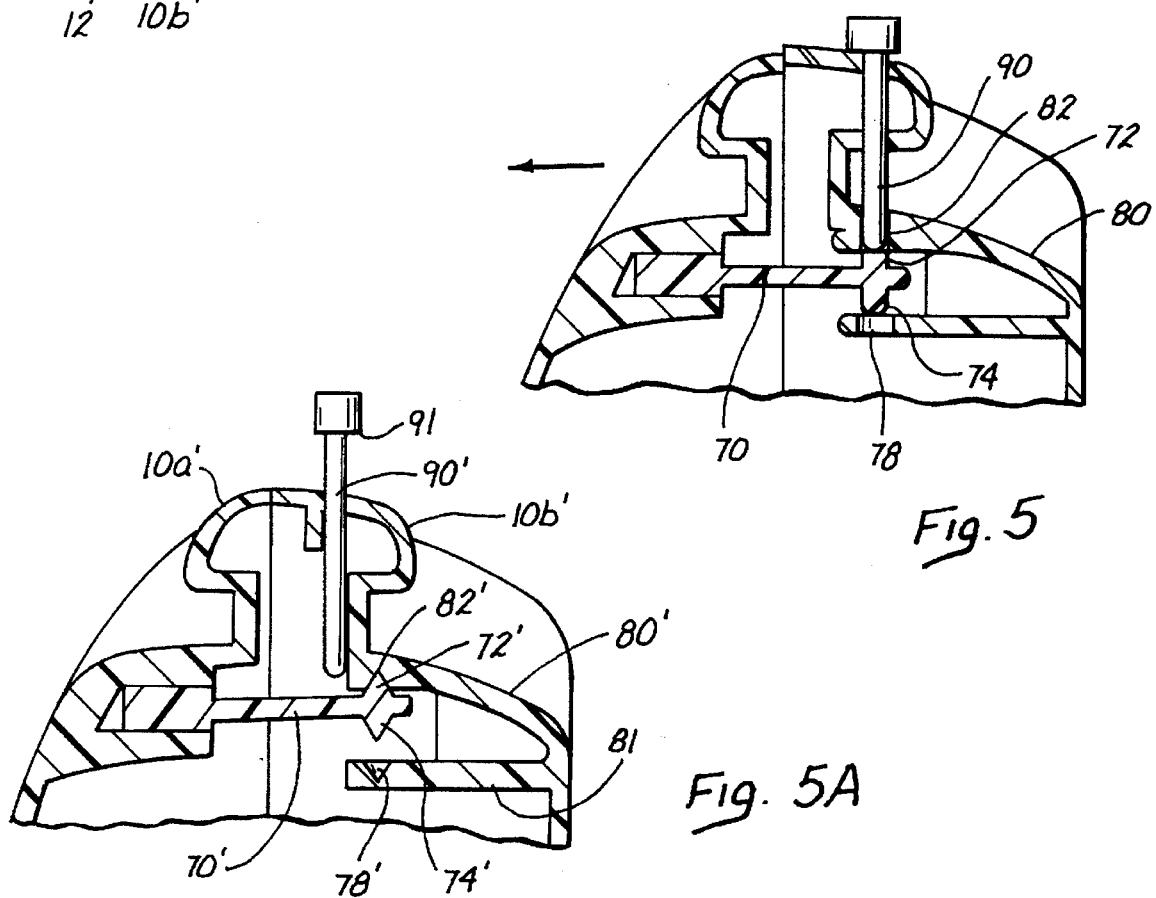
Fig. 5
Fig. 5A

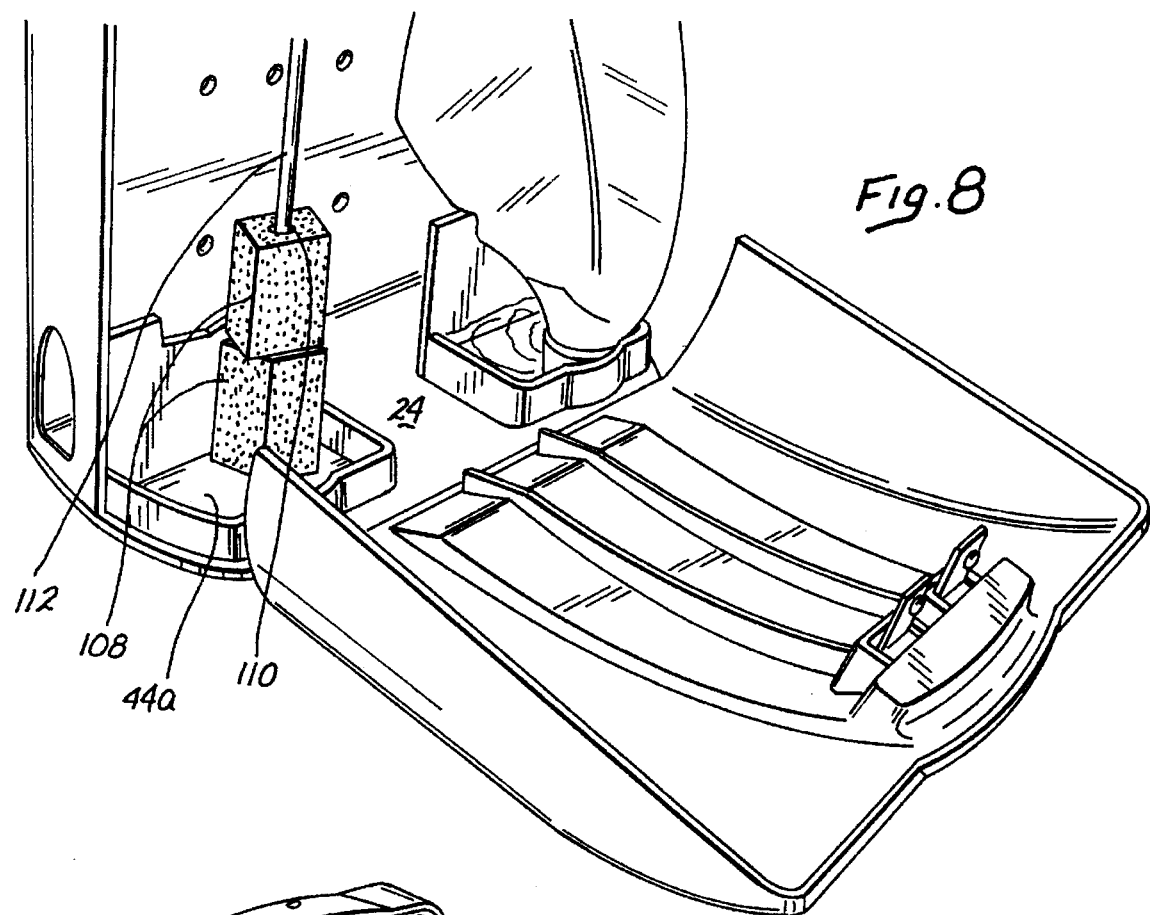
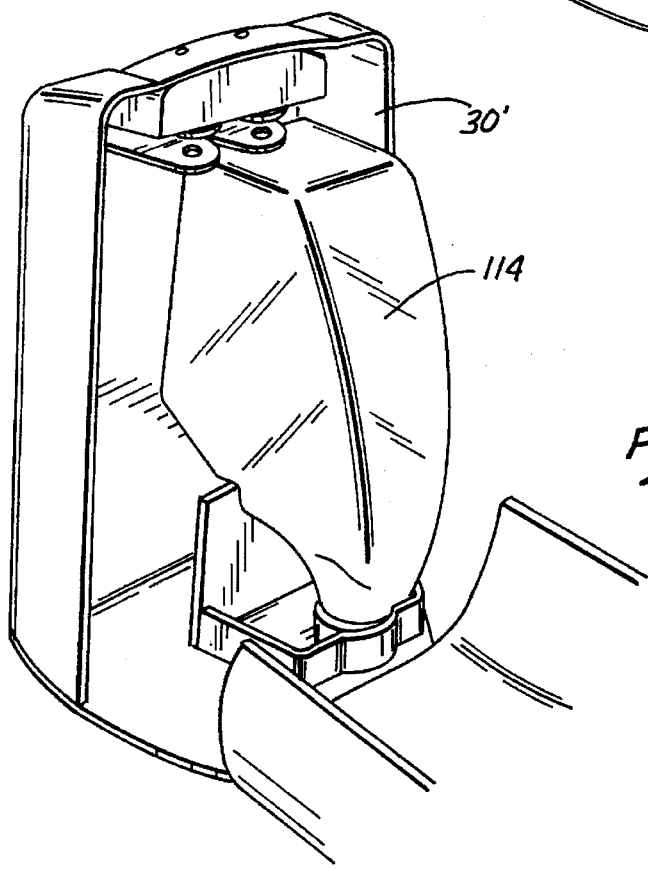

RODENT POISON DISPENSER

FIELD OF THE INVENTION

This invention relates to the field of devices designed to exterminate rodents by poisoning.

DESCRIPTION OF THE PRIOR ART

The present invention represents an improvement upon the devices disclosed in my prior U.S. Pat. No. 5,038,516 and to better enable the method claimed in the said patent to be processed with greater safety.

In addition to what is disclosed in my said prior patent, the latter described certain prior art devices and other devices may be seen in other patents cited as references on the cover of said patent.

While the dispenser disclosed in my prior U.S. Pat. No. 5,038,516 is effective to enable the method claimed therein to be practiced, I have found that improvements may be made to render the dispenser both more effective in accomplishing its objective and safer from the standpoint of preventing any of the poison to be accessed by children or domestic pets.

SUMMARY OF THE INVENTION

The present invention improves its effectiveness by disposing its feeder troughs in an internal diversion from the passageway extending directly between the entrance and exit openings, thereby preventing the rodent from simply rushing through the passageway by entering the access hole and exiting from the opposite end of the passageway after simply giving a quick sniff or tasting a minimal amount of a dry or liquid poison substance. The troughs thus are disposed on the sides of the container which are opposite a wall defining the passage between the entrance and exit openings. A further passage is provided extending at a right angle centrally from the main passage, the end of which further passage is then split into two side passages extending to the forwardly facing troughs of the dispensers. In plan view, the passage configuration would be that of an "H", with the right hand vertical comprising the passage between the entrance and exit to the box. This requires that the rodent make a further entry into the box in order to access one or both of the poison substances with less likelihood that the rodent will simply taste and scamper out instead of stopping to consume a sufficient amount of the poison substance to cause its demise. A further advantage of this structure is that children are prevented from putting fingers or sticks into the box to pull out any of the poison substances to taste or feed to domestic pets.

A further improvement in the dispenser of the present invention over that of my prior patent lies in the fact that the dry food may no longer need be dispensed into the trough by a hopper carrying the food in granulated or pellet form, but the dry food is formed in large cylindrical or rectangular blocks having axial holes through which may be passed a rod extending vertically up from the trough. This type of dispenser prevents poison pellets from being shaken out of the box through the main passageway where the pellets may be picked up and tasted or eaten by children or domestic pets. With these orificed cylindrical blocks, when the bottom block is eaten by a rodent, the block above it slides down the vertical element to seat in the trough as a replacement for the consumed lower block. These blocks cannot fall out through the passageway in contrast to pellets which may inadvertently be discharged through the access or exit openings at the ends of the passageway, particularly when the dispenser box is being carried and the dry food dispenser contains pellets.

It is also a feature of the present invention to provide a liquid dispenser having a valve which is normally closed when the container is inverted, thereby preventing the escape of any fluid. The valve, however, is opened by a vertically extending axial projection in the trough which, when the liquid dispenser is inverted and seated in the container, allows fluid to flow into the liquid dispensing trough. When the liquid dispensing trough has been filled, the liquid therein prevents further discharge from the container, until the liquid level is lowered by the rodents drinking up the liquid bait.

It is also a feature of the present invention to provide special locking means at the top of the housing which may be divided along a transverse vertical plane with the forward part of the housing being hinged at the bottom to the after part of the housing.

The locking mechanism comprises at least one flexible element which is permanently seated inside one of the two parts of the housing and extends across the plane of division of the housing to the other part, at or near the end of which on each side is a vertically extending base coaxial with the other base. The latter includes a receptable in line with the flexible element, with the receptacle being provided with registering opposed orifices, each being adapted to receive one of the bosses of the element when inserted in the orifice. The orifices are spaced apart by a distance of at least as great as the combined distance between the outwardly projecting ends of the element and the thickness of the element. The element is biased upwardly to insert the upper boss in the upper orifice, thereby preventing opening of the housing. When a pin-type key of proper length is pushed down through an access hole in the upper wall of the housing and down through the upper orifice of the receptacle, the upper boss of the element is forced out of the latter orifice so that the element may be withdrawn from the receptacle and the housing opened. However, if a pin of improper length is inserted through the upper orifice, either it will not force the upper boss out of that orifice, or it will push the lower boss into the lower orifice, thereby preventing withdrawal of the flexible element from the receptacle, and hence maintaining the two parts of the housing in locked condition. By increasing the number of locking elements provided, the chance of opening the locking mechanism by inserting separate pin-like members is further diminished. Ideally, providing three of the described flexible elements with a key comprised of a metal plate from which extend, at right angles and, properly spaced apart, three pins of the exact length to move all three elements into release position, would be most effective. Thereby, only a person with a proper service key may unlock the front part of the housing from the rear part.

It is also a feature of the present invention to provide holes in the back walls of the housing through which bolts or other elements may be passed in order to secure the housing to a vertical surface or member such as a wall, fence post or fence itself.

From a consideration of the various features of the invention as summarized above, it may be seen that a most effective poison bait dispenser is produced which lends itself to easy installation and servicing, yet cannot be opened except by the use of destructive force or the proper key in hands of the service man. Inadvertent spillage of solid bait of the pellet-type is prevented, thereby avoiding the possibility of consumption by children or domestic pets.

DESCRIPTION OF THE DRAWINGS

In the accompanying drawings,

FIG. 4 is a sectional view partly broken away and enlarged, taken along the line 4—4 of FIG. 1.

FIG. 5 is a an enlarged detail of the locking mechanism shown in the upper portion of FIG. 4.

FIG. 5A is similar to FIG. 5 but illustrates a variant of the locking arrangement of the present invention.

FIG. 6 is a perspective view of a two pin key shown in end view in FIG. 5.

FIG. 8 is a perspective view similar to FIG. 2 but showing a different type of solid bait dispenser.

FIG. 9 is a partial perspective view of an opened housing in which only a single liquid poison dispenser is provided.

DESCRIPTION OF THE PREFERRED EMBODIMENT

Figure 1:
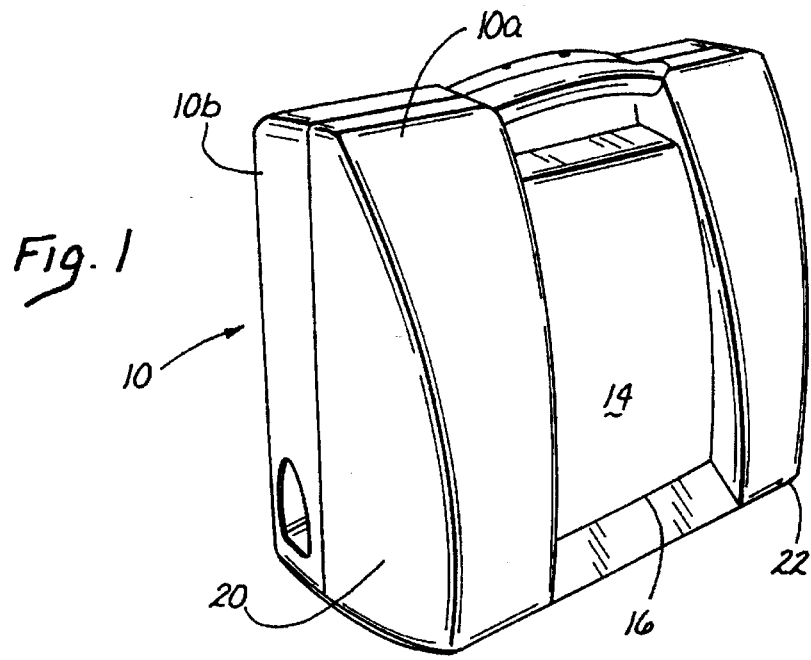
FIG. 1 is a perspective view of the preferred embodiment of the invention with the housing in closed condition.
Figure 2:
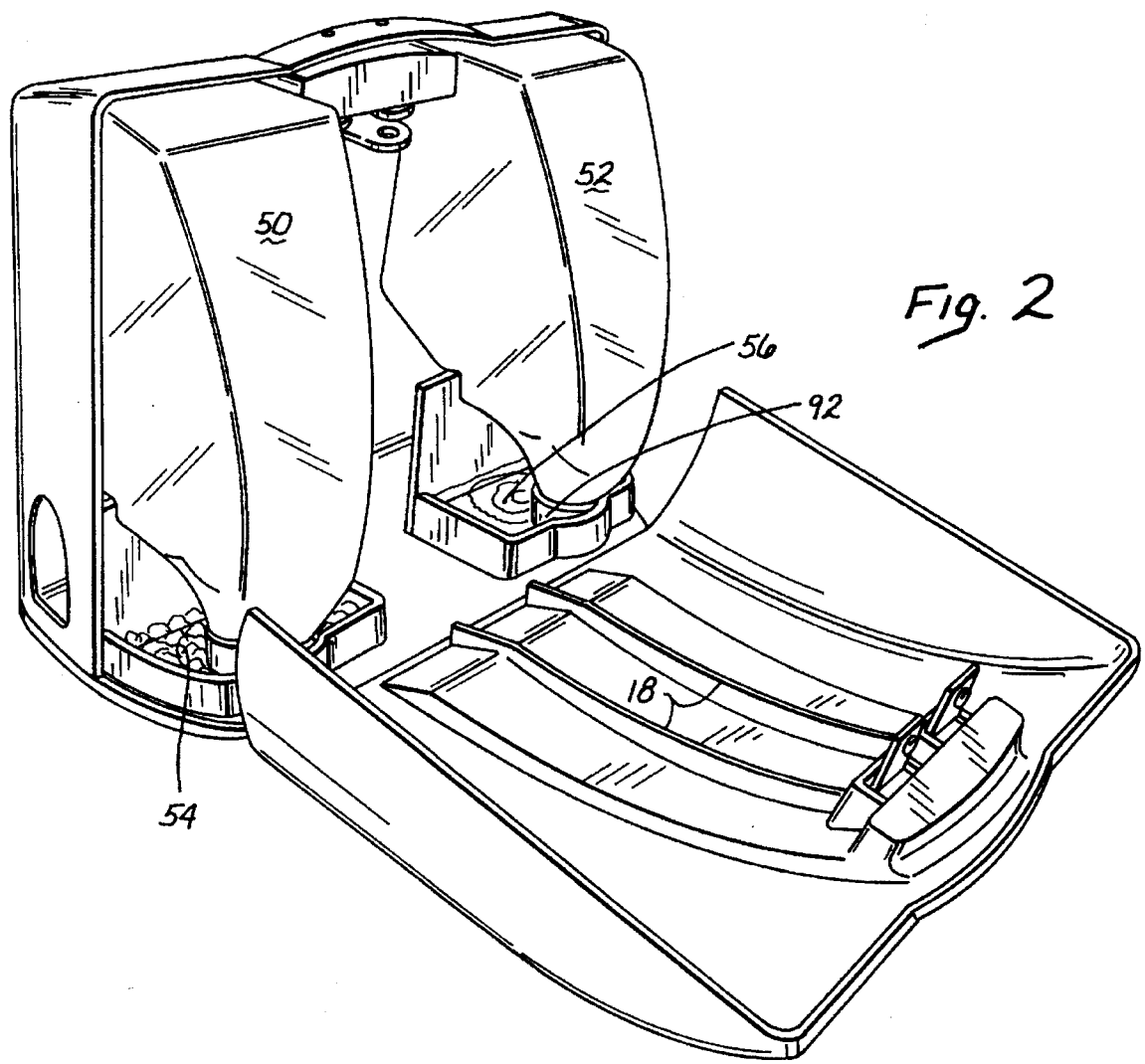
FIG. 2 is an enlarged perspective similar to FIG. 1 except that it shows the housing in opened-up condition with liquid and solid dispensers seated in their dispensing positions.
Figure 3:
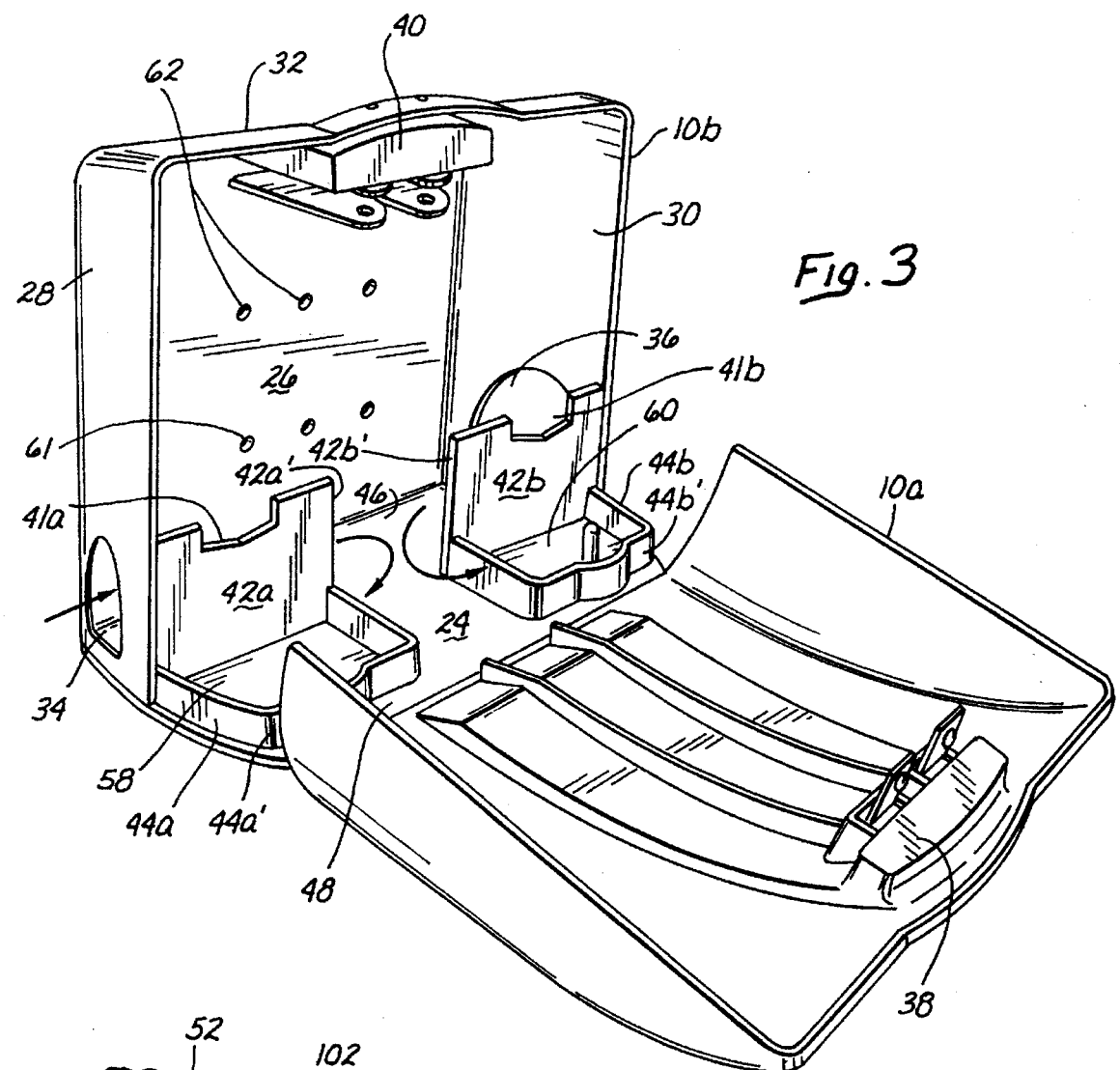
FIG. 3 is a perspective view similar to that of FIG. 2 but showing the liquid and solid dispensers removed from inside the housing.

Referring to FIGS. 1, 2 and 3, the poison bait dispenser of the present invention comprises a housing 10 formed of a front portion 10a and a rear portion 10b. The front and rear portions 10a and 10b are hinged together at 12 (FIG. 4), at least partially along their bottom edges 10a' and 10b'.

The front portion 10a is formed with an arcuate wall 14 convexly curved with a center section 16 which is internally reinforced by ribs 18 and flanked by a pair of arcuately curved side sections 20 and 22 The rear portion 10b against which the forward portion 10a interfits may be formed of a bottom wall 24, a rear wall 26, a pair of oppositely facing spaced apart side walls 28 and 30, and a top wall 32. The lower area of wall 28 has an opening 34 and the lower area of the wall 30 has a similar opening 36. At the top of the front portion 10a, there is provided internally one half of the locking mechanism 38, hereafter to be described, while the underside of the top wall 32 of the rear portion 10b is provided the other half 40 of this locking mechanism.

As may best be seen from FIG. 3, the bottom wall 24 of the rear section 10b may be molded with a plurality of upstanding walls 42a, 42b, 44a and 44b. The walls 42a and 44b may be parallel with, and spaced from, the rear wall 26 by a sufficient distance to clear the openings 34 and 36 in the side walls 28 and 30, respectively. The wall 42a extends inwardly toward the wall 42b from side wall 28, and wall 42b extends inwardly toward wall 42a from side wall 30. The inner vertical edges 42a' and 42b' are spaced from each other to provide access to and from the resulting passage 46 extending between the openings 34 and 36 in the side walls 28 and 30, respectively, and partially defined by the walls 26, 42a and 42b. A second passage 48 parallel to passage 46 is defined by the forward sections 44a' and 44b' of the walls 44a and 44b, respectively, and the inner faces of the center section 16 and side sections 20, 22 comprising the hinged front portion 10a of the dispenser, when that portion 10a is closed against the rear portion 10b.

Desirably, the walls 42a and 42b are centrally notched at 41a, 41b, respectively, where inverted plastic bottled-shaped containers 50, 52 are employed to carry and dispense poisonous pellets 54 and liquid poison 56 from the respective troughs 58 and 60 defined by the walls 42a, 44a, and 44a' in the case of the trough 58, and the walls 42b, 44b and 44b' for the trough 60, as may best be seen in FIGS. 2 and 4. The plastic bottles 50 and 52 are configured to seat in the notches 41a and 41b, respectively.

Because the dispenser 10, when fully set up for its intended purpose, contains both liquid and solid poisons which should not be allowed to be accessed by, or fall into the hands of, children, or be eaten by domestic pets, provision is made for securing the rear wall 26 to some type of fixed vertical surface or support (not shown). A plurality of orifices 62 are provided in the back wall 26 to enable the dispenser 10 to be secured to such fixed vertical surface or support against removal.

In addition, the present invention utilizes a special locking combination 38, 40 to secure the hinged forward portion 10a to the rear portion 10b. This locking system may best be understood from a consideration of FIGS. 4, 5 and 6 of the drawings. The joinder occurring in the vertical plane 64. The lock half 38 comprises a thickened wall portion 66 having a slotting 68 into which is fixedly secured by adhesive or other means (not shown) a flexible element 70 which extends across the plane 64 and is provided at, or near its, outer terminus with a pair of co-axially oppositely extending bosses 72, 74. The lock half 40 is provided with a transversely extending lower plate 76 having an orifice 78 and an upper hood 80 which is spaced from the plate 76 by a distance just slightly more than the distance between the outer end of the bosses 72, 74. The hood 80 is also orificed at 82 coaxially with the orifice 78 in the plate 76. Each of the orifices 78 and 82 is dimensioned slideably to receive the bosses 74 and 72, respectively. The orifice 82 is accessible through a registering orifice 84 in the top wall 32 of the rear portion 10b. Desirably, a plurality of the flexible elements 70 and combinations of the plate 76 and hood 80 should be employed to prevent a person from inserting some type of pin through a single orifice 84 in an effort to manipulate the flexible element 70 to release it from a locking disposition in which one of it bosses 72 or 74 is seated in either orifice 82 or orifice 78, respectively. As may be appreciated, in order to effect a release of the element 70 from the locking half 40, the bosses 72 and 74 must be so disposed that boss 72 is forced downwardly and out of the orifice 82, but not so far that boss 74 is pushed into orifice 78. This disposition is shown in FIG. 5 and is accomplished by providing a key 86 having a plate or block 88 below which extend downwardly one or more pins 90 of the exact length required to place the element 70 in releasing disposition, as shown in FIG. 5. When the element 70 is placed in the releasing disposition referred to above, the front portion 10a of the housing 20 may be pivoted forwardly about the axis of the hinge 12 to depose the front portion 10a in the position shown in FIGS. 2, 3, 8 and 9.

The principle utilized in this locking mechanism may be employed in a slightly different arrangement wherein the upper plate 80' is provided with a recess 82' of a configuration to accommodate a preselected configuration of the coaligned upper boss 72', instead of the orifice 82 through the plate 80, also to receive the key pin 90 to enable the boss 72 to be pushed out of the orifice 82. In the alternate embodiment, the upper boss 72' may be of a different configuration biased into the recess 82', but may be displaced therefrom by pushing a rigid elongated element 90' through a key orifice 91 in either the first or second housing members 10a', 10b' (preferably through 10b' as shown in FIG. 5A), but not so far as to cause its lower boss to enter the recess 78' in the lower plate 81.

Figure 7:
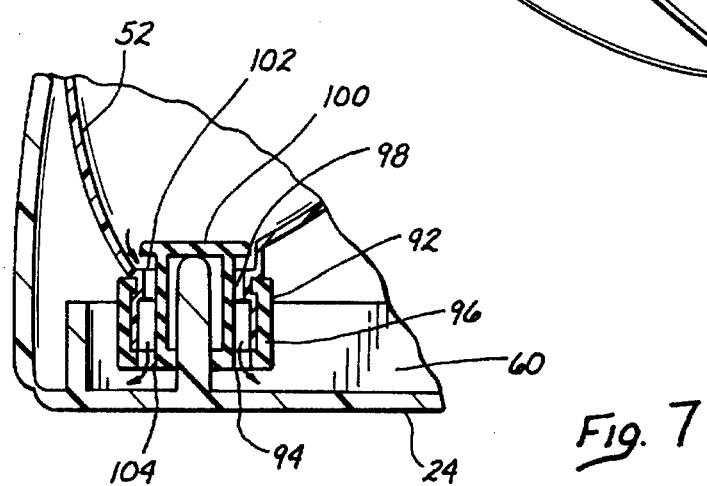
FIG. 7 is an enlarged detail of an embodiment of the invention having a special dispensing cap on the lower end of the liquid dispenser shown in FIG. 2 and seated in the liquid trough shown in FIG. 3.

In the embodiment of the invention shown in FIG. 2, pellets 54 are deposited from the bottle container 50 into the trough 58 in the manner of a hopper. The liquid poison, however, reaches the trough 60 through a bottle-type container which is provided with a valve cap 92 shown in detail in FIG. 7 and actuated by a vertical element 94 extending upwardly from the floor 24 of the rear portion 10b of the housing 10. The cap 92 may comprise an overhung section 96 of a rubber or resilient material which supports by a resilient cylindrical wall 98, a transverse closure member 100. The latter member is normally held into closed position against the inner end 102 of the liquid bottle container 52. However, when the container 52 is inverted so that a cap orifice may be placed over the pin 94 to permit the latter to press against the transverse closure member 100 and stretch the cylindrical wall 98, fluid may pass around the periphery of the transverse closure member and down through channel orifices and into the trough 60.

In the embodiment of the invention shown in FIG. 8, in lieu of the hopper-type dispenser 50 and pellets 54, there is substituted blocks of solid bait which are actually orificed at 110 to be slipped onto a vertical element extending upwardly from that part of the floor 24 in the trough 44a of the lowermost block 108 is consumed, the upper block or blocks 108 slide down the vertical element into the trough as replacement for the consumed poison block.

In the embodiment of the invention shown in FIG. 9, a single liquid dispenser 114 is provided and only a single entry opening (not shown) would be made in the lower portion of the side wall 30'.

In use, the housing 10 as shown in FIG. 1 is opened by inserting the pins 90 of the key 86 into the orifices 82 in the top 32 of the rear portion 10b of the housing. Because the pins 90 are of the proper length, when pushed down into the orifices 82, they will force the elements 70 into releasing position so that the front portion 10a of the housing may be pulled away from the rear portion 10b about the bottom hinge 12, thereby to open the housing 10 to the disposition shown in FIG. 3. Bottle containers 50 and 52 are then inserted and seated on the notches 41a and 41b on the walls 42a and 42b, respectively, to assume the positions shown in FIG. 2. This will result in pellets 54 dropping down out of a container 50 into the trough 58, and fluid poison 56 flowing out of the bottle container 52 and into the trough 60, through the opening of the transverse closure member 100 being pressed against the vertical element 94, thereby allowing the fluid bait to pass into the trough 60 through the cap orifices 104.

Either before or after the bottle containers 50, 52 have been inserted and seated, the back wall 26 of the rear portion of the housing is placed against a barn, garage or other wall, or against a wide fence post and screwed or bolted thereto by screws 61. After being thus secured, and the bottle containers 50 and 52 have been mounted in the notches 41a and 41b in the walls 42a and 42b, respectively, to fill the troughs 58 and 60, the front portion 10a of the housing 10 may then be swung up and back about the hinge 12 to close against the rear portion 10b of the housing 10, where it is locked by the locking mechanisms 38 and 40.

When thus disposed, a rodent (not shown) may enter the housing through either opening 34 or 36 and proceed in the passage 46 to the center where it would be likely to move in between the troughs 58 and 60 to the front passage 48. There the rodent may access either of the troughs for pellets 54 or liquid poison 56. If the rodents' consumption of one or both poisons should not cause its immediate demise within the housing 10, it should do so shortly after the rodent has left the housing by one of the openings 34 or 36.

Because of the disposition of the troughs on the forward sides of the walls 42a and 42b, it is not possible for a small child to insert his hand and arm into the housing openings 34 or 36 to reach either trough with the liquid or solid poison.

Also, because of the nature and effectiveness of the locking mechanism, the latter can only be opened by a key 86 having pins 90 of an exact length.

The dispenser of the present invention, therefore, will be found to be one which can be inexpensively manufactured, light in weight, easy to set up and install and most effective in killing rodents.

I claim:

1. A rodent poison bait dispenser, said dispenser comprising:

a housing to enclose an area, said housing having a front wall, a back wall, a bottom wall, a top wall and a pair of opposed side walls, all of said walls being integrated to define an enclosed area, one of said front and back walls, together with at least a portion of said top and side walls being removably separable along a plane of separation from the remainder of the housing; a lower portion of the enclosed area defined by said housing being divided by at least one partial wall extending upwardly from the bottom wall to provide a forwardly facing trough, a bait dispenser having a lower end adapted to pass poison bait into the trough to maintain the trough in filled condition; the at least one partial wall on said bottom wall defining the back of the trough being spaced from the back wall of said housing and configured to support said bait dispenser above the trough, said trough having a forwardly facing access adjacent the lower end of said bait dispenser, the at least one wall defining the back of the trough and the back wall of the housing defining a first transverse passageway along the bottom wall, said passageway extending behind the trough; and a further connecting passageway leading to the forwardly facing access of the trough; an opening in at least one side wall of the housing; said opening being in communication with said first passageway, whereby a rodent may enter the enclosed area in the housing through the opening in the side wall and proceed along the bottom wall through the first passageway and into further connecting passageway to the forwardly facing access of the trough to consume some of the poison bait.

2. A rodent poison bait dispenser, said dispenser comprising:

a housing to enclose an area, said housing having a front wall, a back wall, a bottom wall, a top wall and a pair of opposed side walls, all of said walls being integrated to define an enclosed upper portion and a lower portion of said area, one of said front and back walls, together with at least a portion of said top and side walls constituting a first portion of the housing removably separable along a plane of separation from the remaining portion of the housing, said plane of separation extending through upper and lower edges of said two portions; the lower portion of the enclosed area defined by said housing being divided by a pair of partial walls extending upwardly from the bottom wall to provide a pair of forwardly facing troughs spaced from each other; a bait dispenser for each trough, one of said bait dispensers having a lower end adapted to pass poison bait in pellet form into the trough to maintain the trough in filled condition and the other of said pair of dispensers also having a lower end adapted to pass liquid poison bait into the trough and to maintain said liquid bait at a predetermined level in the trough; the partial walls on said bottom wall defining the back of the troughs being spaced from the back wall of said housing and each said partial wall being configured to support one of said bait dispensers above one of said troughs, each said trough having a forwardly facing access adjacent the lower end of said bait dispensers, the partial walls defining the backs of the troughs and the back wall of the housing defining a first transverse passageway along the bottom wall, said passageway extending behind the troughs and having a first end and an opposite second end; and a further second passageway extending between the forwardly facing accesses and said front wall; and a third passageway connecting the first and second passageways between the troughs; an opening in a first of said walls of the housing, said opening being adjacent to and in communication with, the first end of said first passageway, whereby a rodent may enter the enclosed area in the housing through said opening in the side wall and proceed along the bottom wall through the first passageway and the third passageway into the second passageway to the forwardly facing access of the troughs to consume some of either or both the solid and liquid poison baits.

3. The rodent poison bait dispenser as described in claim 2 wherein an opening is also provided in the second of said side walls, at the opposite second end of the first passageway to enable a rodent to enter into or exit from said first passageway through either of said openings.

4. The rodent poison bait dispenser as described in claim 2 wherein the removably separable portions of the housing are hinged together along their respective lower edges in the plane of separation and locking means are provided for joining their upper edges.

* * * * *